United States Patent
Baik et al.

(10) Patent No.: US 10,296,905 B2
(45) Date of Patent: May 21, 2019

(54) METHOD AND SYSTEM USING QUANTUM RANDOM GENERATOR

(71) Applicant: EYL INC., Yongin-si (KR)

(72) Inventors: Jung Hyun Baik, Seongnam-si (KR); Seong Joon Cho, Seongnam-si (KR); Bu Suk Jeong, Yongin-si (KR); Dae Hyun Nam, Seoul (KR)

(73) Assignee: EYL INC., Yongin-si (KR)

( * ) Notice: Subject to any disclaimer, the term of this patent is extended or adjusted under 35 U.S.C. 154(b) by 0 days.

(21) Appl. No.: 15/648,981

(22) Filed: Jul. 13, 2017

(65) Prior Publication Data

US 2018/0068305 A1    Mar. 8, 2018

Related U.S. Application Data

(63) Continuation of application No. PCT/KR2017/003674, filed on Apr. 4, 2017.

(30) Foreign Application Priority Data

Sep. 8, 2016  (KR) .................. 10-2016-0115556

(51) Int. Cl.
*G06Q 20/38*  (2012.01)
*G06Q 20/40*  (2012.01)
(Continued)

(52) U.S. Cl.
CPC ......... *G06Q 20/385* (2013.01); *G06Q 20/202* (2013.01); *G06Q 20/327* (2013.01);
(Continued)

(58) Field of Classification Search
None
See application file for complete search history.

(56) References Cited

U.S. PATENT DOCUMENTS

2011/0191244 A1 * 8/2011 Dai .................. G06Q 20/40 705/44
2014/0310185 A1 * 10/2014 Staflin ................ H04L 63/18 705/71

(Continued)

FOREIGN PATENT DOCUMENTS

KR      20120114609      10/2012
KR      101470702 B1 *   12/2014
(Continued)

OTHER PUBLICATIONS

Haw et al., Maximization of Extractable Randomness in a Quantum Random-Number. Physical Review Applied. May 11, 2015. (Year: 2015).*

(Continued)

*Primary Examiner* — Scott A Zare
(74) *Attorney, Agent, or Firm* — Cantor Colburn LLP (57) ABSTRACT

Provided is a settlement authentication method and system using a quantum random number generator. The method includes the steps of requesting, by a mobile terminal, a random number from a bank server and a POS terminal each including a quantum random number generator, periodically receiving a first quantum random number generated by the POS terminal and a second quantum random number generated by the bank server, and simultaneously sending a first quantum random number most recently received from the POS terminal to the bank server and a second quantum random number most recently received from the bank server to the POS terminal when the mobile terminal requests settlement.

9 Claims, 6 Drawing Sheets

(51) Int. Cl.
  *H04L 9/08*   (2006.01)
  *G06Q 20/20*  (2012.01)
  *G06Q 20/32*  (2012.01)
  *G06Q 20/34*  (2012.01)

(52) U.S. Cl.
  CPC ............ *G06Q 20/34* (2013.01); *G06Q 20/40* (2013.01); *G06Q 20/40975* (2013.01); *H04L 9/0852* (2013.01); *H04L 9/0869* (2013.01)

(56) References Cited

U.S. PATENT DOCUMENTS

| | | | |
|---|---|---|---|
| 2015/0193207 A1* | 7/2015 | Pooser | G06F 7/588 |
| | | | 708/255 |
| 2017/0316479 A1* | 11/2017 | Kurian | G06Q 30/0609 |
| 2017/0324552 A1* | 11/2017 | Ahn | H04B 10/70 |
| 2018/0260192 A1* | 9/2018 | Choi | G01J 1/20 |

FOREIGN PATENT DOCUMENTS

| | | |
|---|---|---|
| KR | 20150011284 | 1/2015 |
| KR | 20150128634 | 11/2015 |
| KR | 101616842 | 5/2016 |

OTHER PUBLICATIONS

Han, et al., New concept of physical layer security communication technology, quantum cryptographic communication, The Journal of the Korean Institute of Communications and Information Sciences, Jun. 2014, pp. 46-52.

Eyl Inc., Introduction for Developing Micro Quantum Random Number Generator & Applied Technologies, Sep. 2015, pp. 1-20.

International Search Report—PCT/KR2017/003674 dated Jul. 20, 2017.

\* cited by examiner

METHOD AND SYSTEM USING QUANTUM RANDOM GENERATOR

TECHNICAL FIELD

The present invention relates to a settlement authentication method and system using a quantum random number generator and, more particularly, to a 3-channel settlement authentication method and system using a natural random number.

BACKGROUND ART

A financial card affiliate registered with a settlement service provided by a bank or a credit card company may have a trade cost paid by a customer using a financial card, such as a cash card or credit card provided by the customer. A POS terminal is widely used in the financial service field using the credit card of a customer. A customer who visits a store can pay a price through his or her financial card using a POS terminal provided in the store.

In the financial settlement service using the POS terminal, however, an accident that personal information about a user illegally leaks is generated due to the hacking of card information. In order to solve such a security problem, Korean Patent No. 10-1616842 (POS Payment Processing System Enhanced Security and Method For Processing Payment Thereof) discloses a POS payment processing system having enhanced security although card information is exposed by decoding encrypted code data using a decryption key, but still has a possibility of a security accident if a pseudo random number is used.

DISCLOSURE

Technical Problem

An object of the present invention can provide a 3-channel settlement authentication method and system using a natural random number.

Technical Solution

A method for authenticating, by a mobile terminal, settlement using a quantum random number generator according to the present invention includes the steps of requesting, by a mobile terminal, a random number from a bank server and a POS terminal each including a quantum random number generator, periodically receiving a first quantum random number generated by the POS terminal and a second quantum random number generated by the bank server, and simultaneously sending a first quantum random number most recently received from the POS terminal to the bank server and a second quantum random number most recently received from the bank server to the POS terminal when the mobile terminal requests settlement.

A method for authenticating, by a POS terminal, settlement using a quantum random number generator according to the present invention includes the steps of generating, by the POS terminal, a first quantum random number when a random number request is received from a mobile terminal, periodically sending the first quantum random number to the mobile terminal and a bank server, receiving a second quantum random number from the mobile terminal and comparing the second quantum random number received from the mobile terminal with a second quantum random number received from the bank server, and sending a settlement approval signal to the bank server if a result of the comparison is identical.

A method for authenticating, by a bank server, settlement using a quantum random number generator according to the present invention includes the steps of generating, by the bank server, a second quantum random number when a random number request is received from a mobile terminal, periodically sending the second quantum random number to the mobile terminal and a POS terminal, receiving a first quantum random number from the mobile terminal and comparing the first quantum random number received from the mobile terminal with a first quantum random number received from the POS terminal, and sending a settlement approval signal to the mobile terminal and the POS terminal if a result of the comparison is identical and when a settlement request signal is received from the POS terminal.

Advantageous Effects

In accordance with the present invention, the disadvantages of a pseudo random number key are overcome to enhance security and authentication because 3-channel settlement authentication is performed using a natural random number generated by the quantum random number generator.

A settlement service having enhanced security can be implemented without a separate installation cost because a quantum random number generator module of a USB form is connected to a POS terminal and a bank server.

MODE FOR INVENTION

A specific structural or functional description of embodiments according to the concept of the present invention this specification has been merely illustrated for the purpose of describing the embodiments according to the concept of the present invention, and the embodiments according to the concept of the present invention may be implemented in various forms and are not limited to embodiments described in this specification.

The embodiments according to the concept of the present invention may be changed in various ways and may have various forms, and thus the embodiments are illustrated in the drawings and described in detail in this specification. However, this is not intended to limit the embodiments according to the concept of the present invention to specific disclosed forms and includes all of changes, equivalents or substitutes included in the spirit and technical scope of the present invention.

The terms used in this application are used to only describe specific embodiments and are not intended to restrict the present invention. An expression of the singular number includes an expression of the plural number unless clearly defined otherwise in the context. In this specification, terms, such as "include" or "have", are intended to designate that characteristics, numbers, steps, operations, elements, or parts which are described in the specification, or a combination of them exist, and should not be understood that they exclude the existence or possible addition of one or more other characteristics, numbers, steps, operations, elements, parts, or combinations of them in advance.

Hereinafter, the embodiments of the present invention are described in detail with reference to the drawings attached to this specification.

Figure 1:
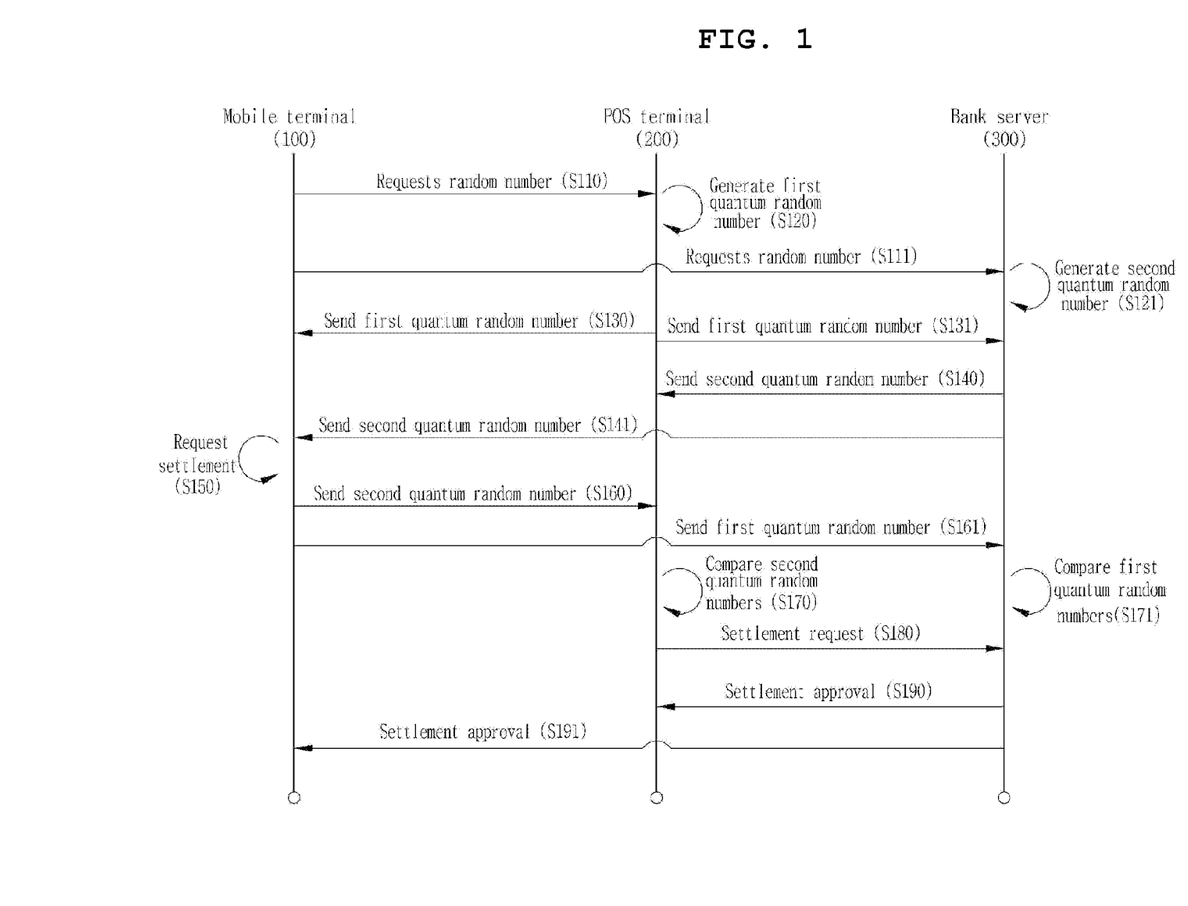
FIG. 1 is a flowchart illustrating a settlement authentication method using a quantum random number generator in accordance with an embodiment.

FIG. 1 is a flowchart illustrating a settlement authentication method using a quantum random number generator in accordance with an embodiment.

Referring to FIG. 1, in the 3-channel settlement authentication method using a quantum random number generator, first, a mobile terminal 100 requests a random number from a POS terminal 200 and a bank server 300 (S110, S111). Step S110 and step S111 may be sequentially performed or simultaneously performed.

When the random number request is received from the mobile terminal 100, the quantum random number generation unit of the POS terminal 200 generates a first quantum random number QRN1 (S120). The quantum random number generation unit may be connected to the POS terminal 200 in a USB form, but is not limited thereto. The quantum random number generation unit may be included in the POS terminal in a module form and may operate. The quantum random number generation unit may generate a natural random number using a random pulse which is generated in accordance with the emission time of alpha particles emitted when an atomic nucleus naturally collapses.

When the random number request is received from the mobile terminal 100, the quantum random number generation unit of the bank server 300 generates a second quantum random number QRN2 (S121). The quantum random number generation unit may be connected to the bank server 300 in a USB form, but is not limited thereto. The quantum random number generation unit may be included in the bank server 300 in a module form and may operate. The quantum random number generation unit may generate a natural random number using a random pulse which is generated in accordance with the emission time of alpha particles emitted when an atomic nucleus naturally collapses.

Thereafter, the POS terminal 200 sends the generated first quantum random number QRN1 to the mobile terminal 100 and the bank server 300 (S130, S131). The bank server 300 sends the generated second quantum random number QRN2 to the mobile terminal 100 and the POS terminal 200 (S140, S141).

Steps S110 to S141 may repeatedly operate in a cycle of one per 1 second to 10 seconds. That is, the mobile terminal 100 may receive and update the first quantum random number QRN1 and the second quantum random number QRN by repeating steps S110 to S141 in the cycle.

Thereafter, when a user requests settlement (S150), the mobile terminal 100 sends the second quantum random number QRN2, received from the bank server 300, to the POS terminal 200 (S160) and sends the first quantum random number QRN1, received from the POS terminal 200, to the bank server 300 (S161).

Thereafter, the POS terminal 200 compares the second quantum random number received from the bank server 300 with the second quantum random number received from the mobile terminal (S170). If, as a result of the comparison, it is found that the second quantum random number is identical with the second quantum random number, the POS terminal 200 sends a settlement request to the bank server 300.

The bank server 300 compares the first quantum random number QRN1, received from the POS terminal 200, with the first quantum random number QRN1 received from the mobile terminal (S171). If, as a result of the comparison, it is found that the first quantum random number QRN1 is identical with the first quantum random number QRN1 and when the settlement request is received from the POS terminal 200, the bank server 300 approves the settlement for the mobile terminal 100 and the POS terminal 200 (S190, S191).

That is, a settlement authentication system using a quantum random number generator includes the mobile terminal 100, the POS terminal 200 and the bank server 300, and performs 3-channel settlement authentication on the first quantum random number QRN1 of the natural random number generated by the POS terminal 200 and the second quantum random number QRN2 of the natural random number generated by the bank server 300 through the mobile terminal 100, thereby being capable of improving security and authentication.

Figure 2:
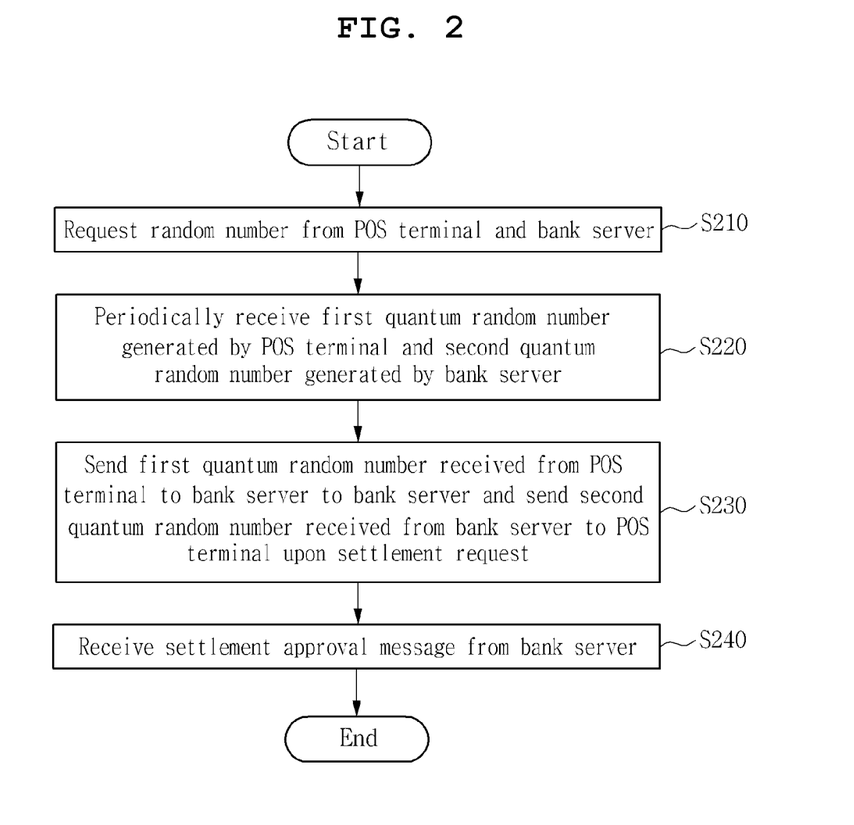
FIG. 2 is a flowchart illustrating a method for authenticating, by a mobile terminal, settlement using a quantum random number generator in accordance with an embodiment.

FIG. 2 is a flowchart illustrating a method for authenticating, by the mobile terminal, settlement using a quantum random number generator in accordance with an embodiment.

Referring to FIG. 2, in the method for authenticating, by the mobile terminal, settlement using a quantum random number generator, first, the mobile terminal 100 requests a random number from the POS terminal 200 and the bank server 300 including a quantum random number generator (S210).

Thereafter, the mobile terminal 100 periodically receives a first quantum random number QRN1 generated by the POS terminal 200 and a second quantum random number QRN2 generated by the bank server 300 (S220). In this case, the mobile terminal 100 may repeatedly receive the first quantum random number and the second quantum random number in a cycle of one per 1 second to 10 seconds, and may update the received first quantum random number and second quantum random number.

Thereafter, when a user requests settlement, the mobile terminal 100 sends a first quantum random number QRN1 that has been most recently received from the POS terminal 200 to the bank server 300, and sends a second quantum random number QRN2 that has been most recently received from the bank server 300 to the POS terminal 200 (S230).

Thereafter, the mobile terminal 100 receives a settlement approval message from the bank server 300 (S240). In this case, if the first quantum random number QRN1 received from the mobile terminal 100 is identical with the first quantum random number QRN1 received from the POS terminal 200 and when a settlement request signal is received from the POS terminal 200, the bank server 300 sends the settlement approval message to the mobile terminal 100.

Each of the first quantum random number and the second quantum random number may be a natural random number generated using a random pulse which is generated in accordance with the emission time of alpha particles emitted when an atomic nucleus naturally collapses.

Figure 3:
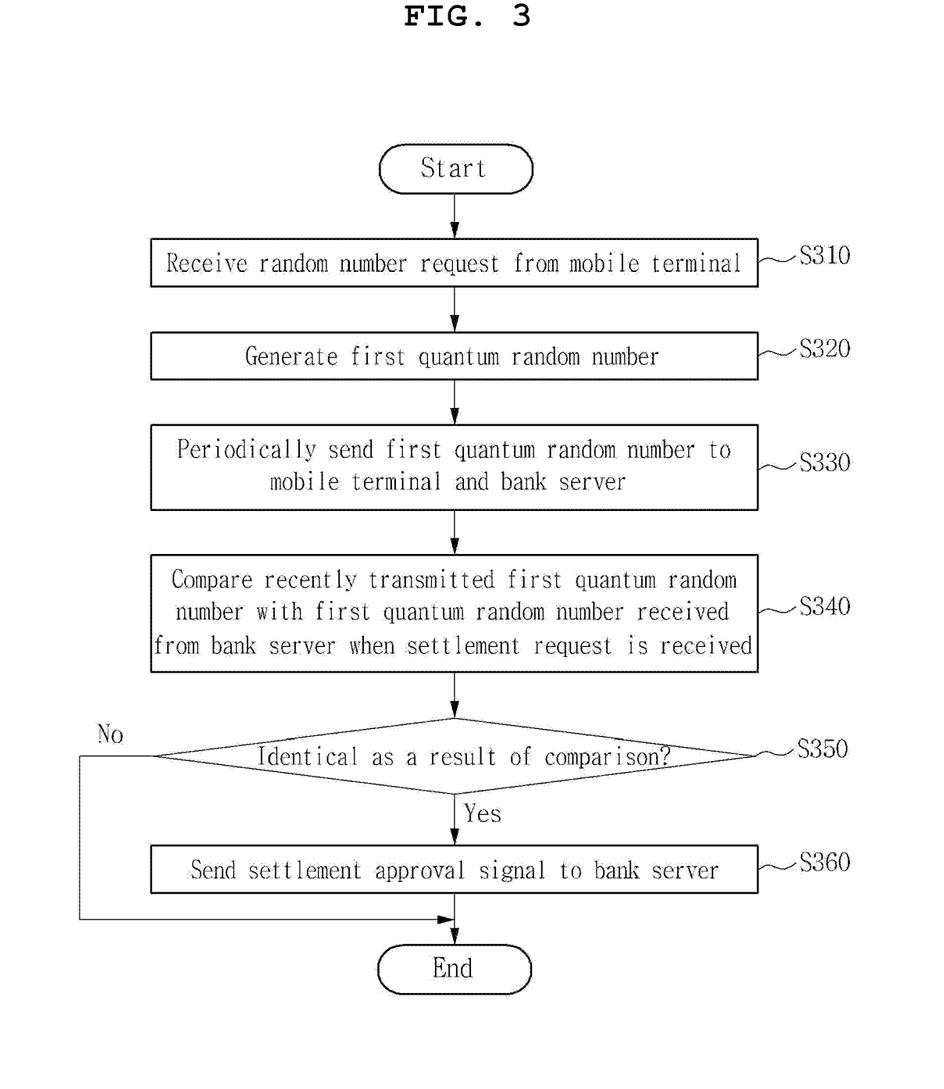
FIG. 3 is a flowchart illustrating a method for authenticating, by a POS terminal, settlement using a quantum random number generator in accordance with an embodiment.

FIG. 3 is a flowchart illustrating a method for authenticating, by the POS terminal, settlement using a quantum random number generator in accordance with an embodiment.

Referring to FIG. 3, in the method for authenticating, by the POS terminal, settlement using a quantum random number generator, first, when a random number request is received from the mobile terminal 100 (S310), the POS terminal 200 generates a first quantum random number QRN1 (S320).

Thereafter, the POS terminal periodically sends the first quantum random number QRN1 to the mobile terminal 100 and the bank server 300 (S330), and periodically receives a second quantum random number QRN2 from the bank server 300. In this case, the POS terminal 200 sends the first quantum random number QRN1 in a cycle of one per 1 second to 10 seconds.

Thereafter, the POS terminal 200 receives a second quantum random number QRN2 from the mobile terminal 100, and compares the second quantum random number QRN2 received from the mobile terminal 100 with the second quantum random number received from the bank server 300 (S340).

If a result of the comparison is the same, the POS terminal 200 sends a settlement approval signal to the bank server 300 (S360).

Figure 4:
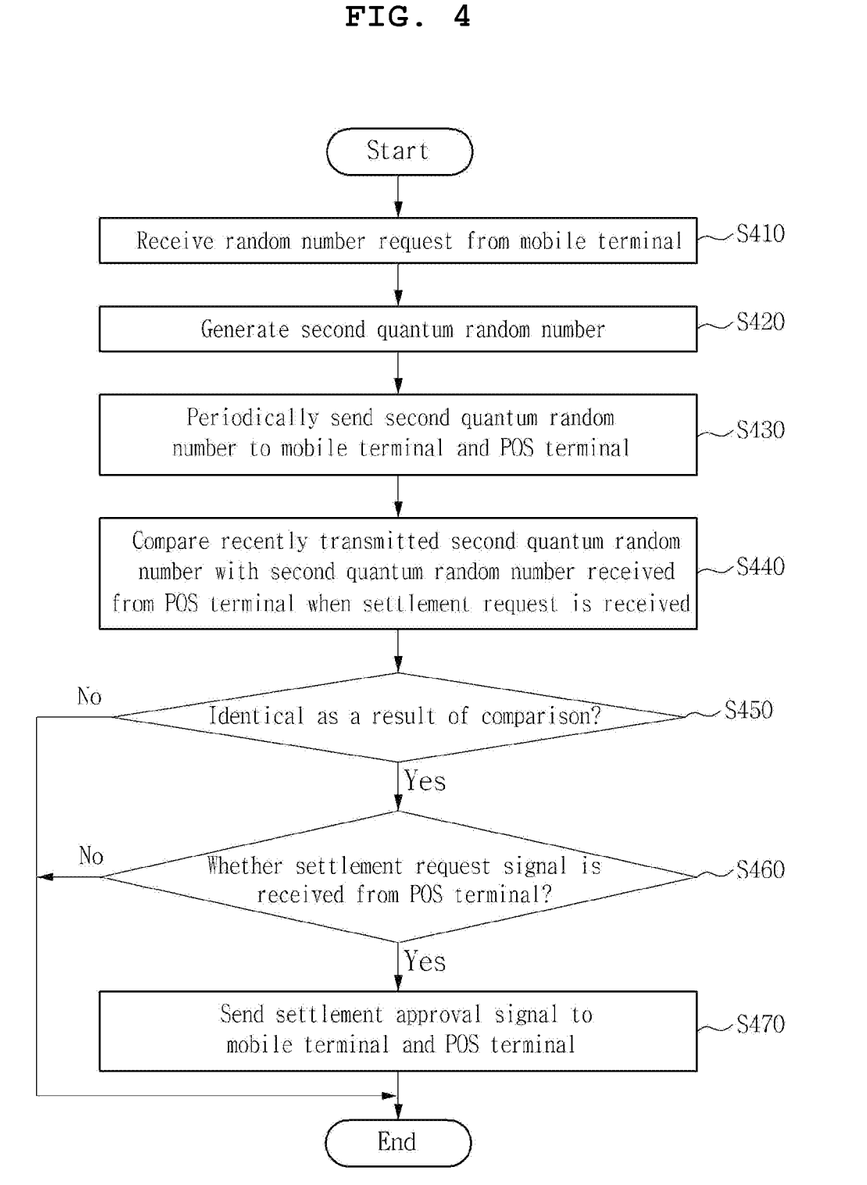
FIG. 4 is a flowchart illustrating a method for authenticating, by a bank server, settlement using a quantum random number generator in accordance with an embodiment.

FIG. 4 is a flowchart illustrating a method for authenticating, by the bank server, settlement using a quantum random number generator in accordance with an embodiment.

Referring to FIG. 4, in the method for authenticating, by the bank server, settlement using a quantum random number generator, first, when a random number request is received from the mobile terminal 100 (S410), the bank server 300 generates a second quantum random number QRN2 (S420).

Thereafter, the bank server 300 periodically sends the second quantum random number QRN2 to the mobile terminal 100 and the POS terminal 200 (S430) and periodically receives a first quantum random number QRN1 from the POS terminal 200.

Thereafter, the bank server 300 receives a first quantum random number QRN1 from the mobile terminal 100, and compares the first quantum random number QRN1 received from the mobile terminal 100 with the first quantum random number QRN1 received from the POS terminal 200 (S440).

If a result of the comparison is the same (S450) and when a settlement request signal is received from the POS terminal 200 (S460), the bank server 300 sends a settlement approval signal to the mobile terminal 100 and the POS terminal 200 (S470).

Figure 5:
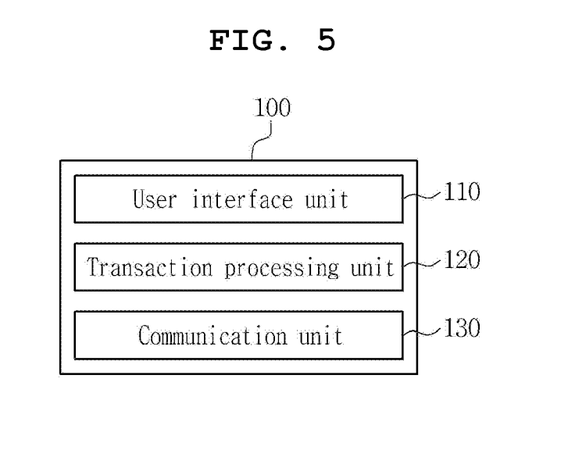
FIG. 5 is a block diagram of the mobile terminal for providing the settlement authentication method using a quantum random number generator in accordance with an embodiment.

FIG. 5 is a block diagram of the mobile terminal for providing the settlement authentication method using a quantum random number generator in accordance with an embodiment.

Referring to FIG. 5, the mobile terminal 100 includes a user interface unit 110, a transaction processing unit 120 and a communication unit 130.

The transaction processing unit 120 may generate a transaction preamble based on the contents of transactions received from the user of the mobile terminal 100 through the user interface unit 110, and may encrypt the generated transaction preamble. The transaction processing unit 120 may request a random number from the POS terminal 200 and the bank server 300 through the communication unit 130, and may send or receive a first quantum random number QRN1 and a second quantum random number QRN2. The transaction processing unit 120 may repeatedly request the random number in a cycle of one per 1 second to 10 seconds. Furthermore, when settlement approval is received from the bank server 300, the user may finally approve the settlement.

The mobile terminal 100 may further include a settlement application driving unit (not shown) for driving an application provided by a bank or a card company. A transaction request may be received from the user of the mobile terminal and processed through the settlement application driven by the settlement application driving unit.

Figure 6:
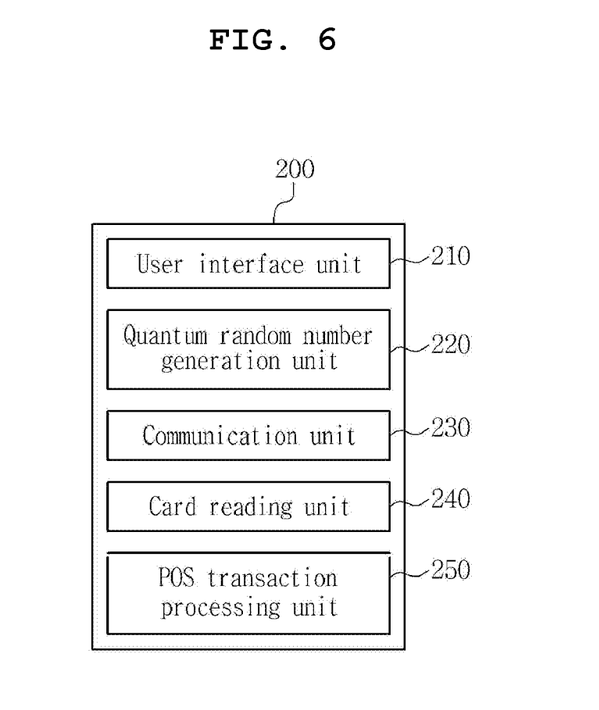
FIG. 6 is a block diagram of the POS terminal for providing the settlement authentication method using a quantum random number generator in accordance with an embodiment.

FIG. 6 is a block diagram of the POS terminal for providing the settlement authentication method using a quantum random number generator in accordance with an embodiment.

Referring to FIG. 6, the POS terminal 200 includes a user interface unit 210, a quantum random number generation unit 220, a communication unit 230, a card reading unit 240 and a POS transaction processing unit 250.

The card reading unit 240 may read the card number of a financial card by reading the financial card. The user interface unit 210 may generate a password of the financial card input by the user of the financial card, a cash account password of a cash IC card, etc. The card reading unit 240 may come into direct contact with the financial card and receive financial card information previously stored in the mobile terminal 100.

The quantum random number generation unit 220 may be connected to the POS terminal in a USB form or included in the POS terminal in a module form, and may operate. When a random number request is received from the mobile terminal 100, the quantum random number generation unit 220 may generate a first quantum random number QRN1. The first quantum random number QRN1 is a natural random number generated using a random pulse which is generated in accordance with the emission time of alpha particles emitted when an atomic nucleus naturally collapses.

The POS transaction processing unit 250 may send the first quantum random number QRN1 to the mobile terminal 100 and the bank server 300 through the communication unit 230, and may receive second quantum random numbers QRN2 from the mobile terminal 100 and the bank server 300. The POS transaction processing unit 250 may repeatedly generate and send the first quantum random number in a cycle of one per 1 second to 10 seconds. The POS transaction processing unit 250 may determine whether the second quantum random number QRN2 received from the mobile terminal 100 is identical with the second quantum random number QRN2 received from the bank server 300 by comparing the second quantum random number QRN2 received from the mobile terminal 100 with the second quantum random number QRN2 received from the bank server 300. If a result of the comparison is the same, the POS transaction processing unit 250 may send a settlement request to the bank server 300.

Figure 7:
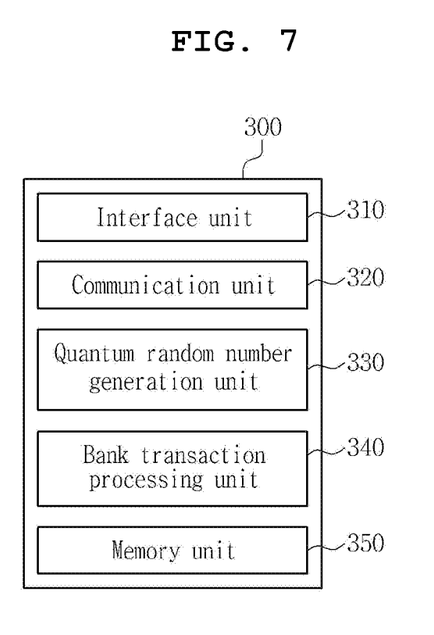
FIG. 7 is a block diagram of the bank server for providing the settlement authentication method using a quantum random number generator in accordance with an embodiment.

FIG. 7 is a block diagram of the bank server for providing the settlement authentication method using a quantum random number generator in accordance with an embodiment.

Referring to FIG. 7, the bank server 300 includes an interface unit 310, a communication unit 320, a quantum random number generation unit 330, a bank transaction processing unit 340 and a memory unit 350.

The quantum random number generation unit 330 may be connected to the bank server in a USB form or included in the bank server in a module form, and may operate. When a random number request is received from the mobile terminal 100, the quantum random number generation unit 330 may generate a second quantum random number QRN2. The second quantum random number QRN2 is a natural random number generated using a random pulse which is generated in accordance with the emission time of alpha particles emitted when an atomic nucleus naturally collapses.

The bank transaction processing unit 340 may send the second quantum random number QRN2 to the mobile terminal 100 and the POS terminal 200 through the communication unit 320, and may receive a first quantum random number QRN1 from the mobile terminal 100 and the POS terminal. If a random number request is present, the bank transaction processing unit 340 may repeatedly generate and send the second quantum random number in a cycle of one per 1 second to 10 seconds. The bank transaction processing unit 340 may determine whether the first quantum random number QRN2 received from the mobile terminal 100 is identical with the first quantum random number QRN2 received from the POS terminal 200 by comparing the first quantum random number QRN2 received from the mobile terminal 100 with the first quantum random number QRN2 received from the POS terminal 200. If a result of the comparison is the same and when a settlement request is received from the POS terminal, the bank transaction processing unit 340 may send a settlement approval message to the mobile terminal 100 and the POS terminal 200.

Although the embodiments of the present invention have been described with reference to the accompanying drawings, they are only illustrative. A person having ordinary skill in the art will understand that the present invention may be modified in various ways and that other equivalent embodiments of the present invention are possible. Accordingly, the true range of protection of the present invention should be determined by the following claims.

The invention claimed is:

1. A method for authenticating, by a mobile terminal, settlement using a quantum random number generator, the method comprising steps of:
   (a) requesting, by the mobile terminal, a random number from a bank server and a POS terminal each comprising a quantum random number generator;
   (b) periodically receiving a first quantum random number generated by the POS terminal and a second quantum random number generated by the bank server; and
   (c) simultaneously sending a first quantum random number most recently received from the POS terminal to the bank server and a second quantum random number most recently received from the bank server to the POS terminal when the mobile terminal requests settlement.

2. The method of claim 1, wherein the step (b) comprises receiving, by the mobile terminal, the first quantum random number and the second quantum random number in a cycle of one per 1 second to 10 seconds.

3. The method of claim 1, wherein each of the first quantum random number and the second quantum random number is a natural random number generated using a random pulse which is generated in accordance with an emission time of alpha particles emitted when an atomic nucleus naturally collapses.

4. The method of claim 1, further comprising a step of (d) receiving a settlement approval message from the bank server,
   wherein the bank server sends the settlement approval message to the mobile terminal if a most recently transmitted second quantum random number is identical with the second quantum random number received from the POS terminal and when a settlement request signal is received from the POS terminal.

5. A method for authenticating, by a POS terminal, settlement using a quantum random number generator, the method comprising steps of:
   (a) generating, by the POS terminal, a first quantum random number when a random number request is received from a mobile terminal;
   (b) periodically sending the first quantum random number to the mobile terminal and a bank server;
   (c) receiving a second quantum random number from the mobile terminal and comparing the second quantum random number received from the mobile terminal with a second quantum random number received from the bank server; and
   (d) sending a settlement approval signal to the bank server if a result of the comparison is identical.

6. The method of claim 5, wherein the step (b) comprises sending, by the POS terminal, the first quantum random number in a cycle of one per 1 second to 10 seconds.

7. The method of claim 5, wherein each of the first quantum random number and the second quantum random number is a natural random number generated using a random pulse which is generated in accordance with an emission time of alpha particles emitted when an atomic nucleus naturally collapses.

8. A method for authenticating, by a bank server, settlement using a quantum random number generator, the method comprising steps of:
   (a) generating, by the bank server, a second quantum random number when a random number request is received from a mobile terminal;
   (b) periodically sending the second quantum random number to the mobile terminal and a POS terminal;
   (c) receiving a first quantum random number from the mobile terminal and comparing the first quantum random number received from the mobile terminal with a first quantum random number received from the POS terminal; and
   (d) sending a settlement approval signal to the mobile terminal and the POS terminal if a result of the comparison is identical and when a settlement request signal is received from the POS terminal.

9. The method of claim 8, wherein each of the first quantum random number and the second quantum random number is a natural random number generated using a random pulse which is generated in accordance with an emission time of alpha particles emitted when an atomic nucleus naturally collapses.

* * * * *